Nov. 26, 1963  L. G. SIMJIAN  3,112,019
DEPOSITORY APPARATUS
Filed Jan. 6, 1961  5 Sheets-Sheet 1

INVENTOR.
LUTHER G. SIMJIAN
BY
*Ervin B. Steinberg*
AGENT.

Nov. 26, 1963 L. G. SIMJIAN 3,112,019
DEPOSITORY APPARATUS
Filed Jan. 6, 1961 5 Sheets-Sheet 2

INVENTOR.
LUTHER G. SIMJIAN
BY
Erwin B. Steinberg
AGENT.

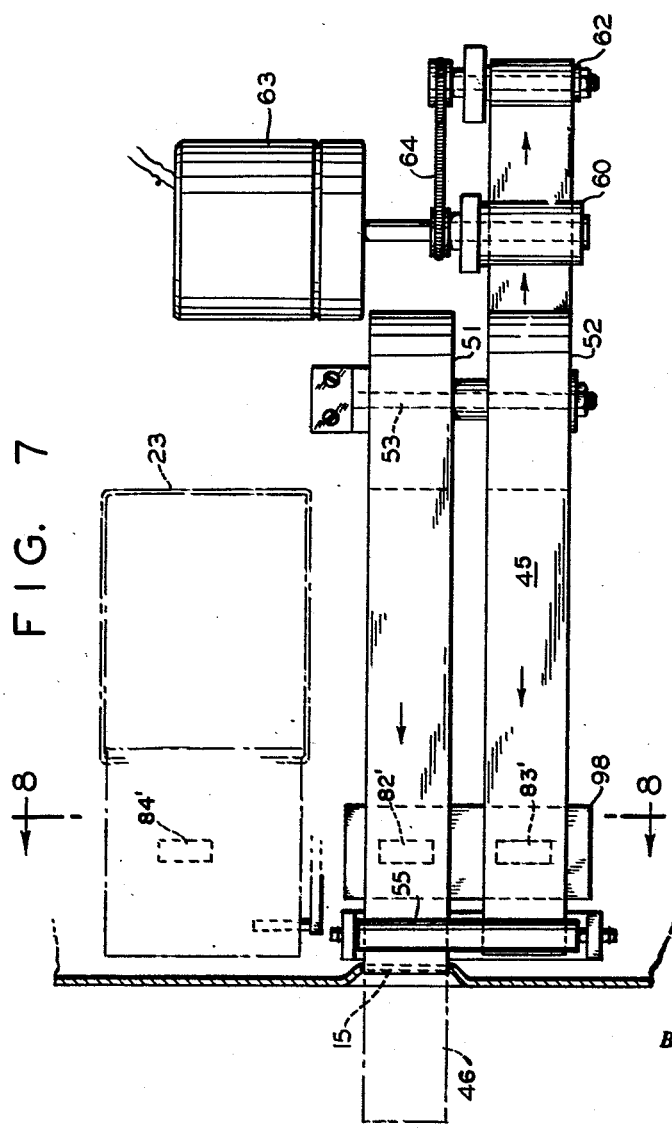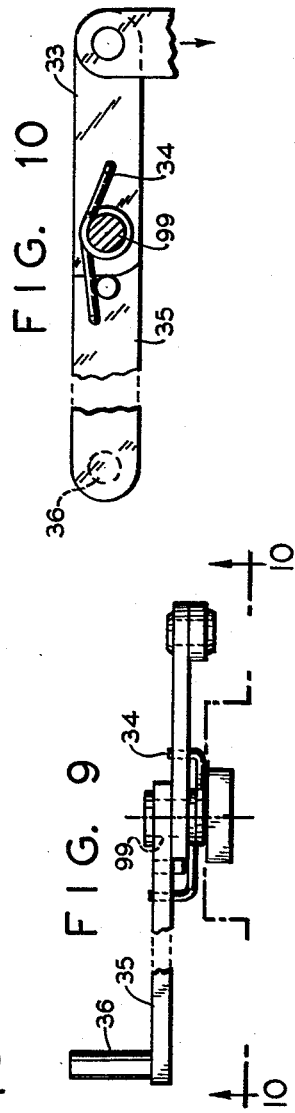

Nov. 26, 1963 L. G. SIMJIAN 3,112,019
DEPOSITORY APPARATUS
Filed Jan. 6, 1961 5 Sheets-Sheet 4

INVENTOR.
LUTHER G. SIMJIAN
BY
Erwin B. Steinberg
AGENT.

Nov. 26, 1963 L. G. SIMJIAN 3,112,019
DEPOSITORY APPARATUS
Filed Jan. 6, 1961 5 Sheets-Sheet 5
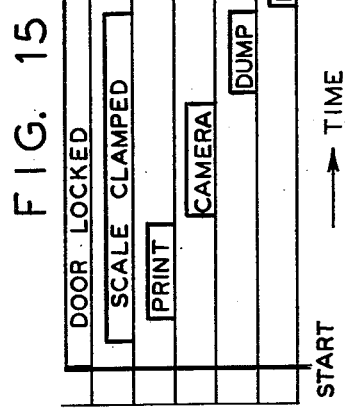
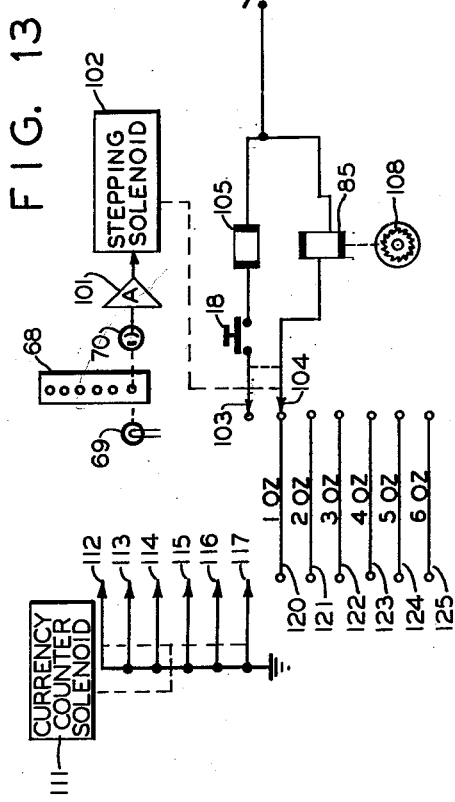
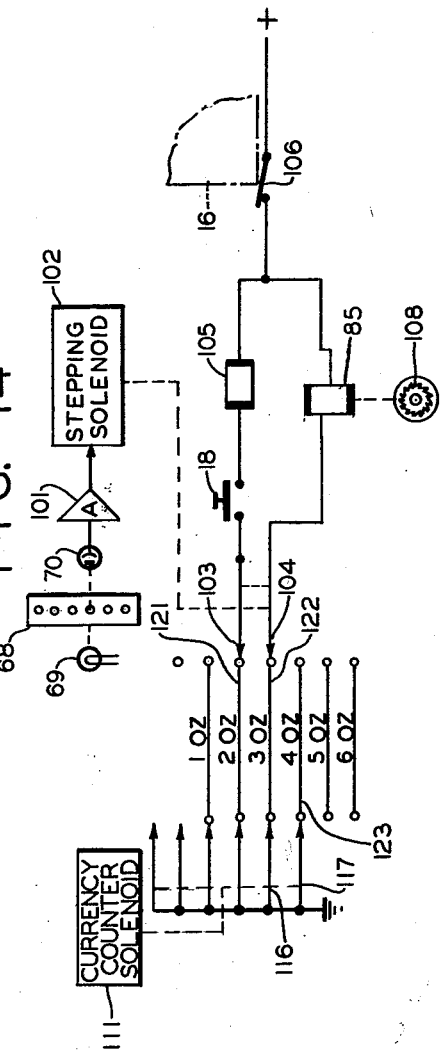
*INVENTOR.*
LUTHER G. SIMJIAN
BY
AGENT.

United States Patent Office 3,112,019
Patented Nov. 26, 1963

3,112,019
DEPOSITORY APPARATUS
Luther G. Simjian, Greenwich, Conn., assignor to Universal Match Corporation, St. Louis, Mo., a corporation of Delaware
Filed Jan. 6, 1961, Ser. No. 81,180
10 Claims. (Cl. 194—2)

This invention refers to depository apparatus and more specifically refers to an apparatus wherein an article is moved to a depository and rendered inaccessible to the depositor in response to the payment of money which is commensurate with the article.

When depositing articles such as mail or parcels, the amount of money required is related to the weight and the type of article. Assuming that an apparatus is restricted to a certain type or category of articles, it is possible to provide an apparatus which upon receipt of the proper amount of money accepts an article for mailing purposes. Hence, a machine exhibiting these features is extremely useful for installation at various places of business and commerce to accept articles for mailing purposes, particularly for effecting deposit of mail after the regular office hours, or on Sundays and holidays when mailing windows attended by regular clerks are closed. Although the above example describes primarily the use of the apparatus for mailing of articles, it will be apparent to those skilled in the art that the instant invention may be practiced for other purposes whenever the weight or size of an article to be deposited is related to a pre-established amount of money, which amount is required to be furnished prior to the deposit operation is permitted to occur.

One of the objects of this invention therefore is the provision of a depository apparatus which is adapted to accept articles such as letters and packages when a sufficient amount of postage has been paid.

Another object of this invention is the provision of an apparatus which permits mailing of letters and packages without the use of an attendant.

Another object of this invention is the provision of a depository apparatus which accepts articles for deposit only after money in an amount sufficient to cover postage has been supplied.

A further object of this invention is the provision of a depository apparatus including weighing means wherein the weight of the article is commensurate with the amount of money to be paid for effecting deposit of the particular article.

A still further object of this invention is the provision of a depository apparatus which includes indicia affixing and image recording means to provide a documentary record of the accepted deposit.

A further and still other object of this invention is the provision of a depository apparatus which has means for determining the amount of monetary deposit required for accepting an article and which affixes identifying indicia to the article, records an image of the article and which furthermore, provides to the depositor a receipt in exchange for the article accepted for deposit.

Still other and further objects of this invention will be apparent by reference to the following description when taken in conjunction with the accompanying drawings in which:

FIGURE 7 is a plan view, partly in section, along lines 7—7 in FIGURE 6;

FIGURE 9 is a top view of a detail portion in FIGURE 3;

FIGURE 10 is a side view of the same detail portion as seen along lines 10—10 in FIGURE 9;

FIGURE 13 is a schematic electrical circuit diagram of the weighing and currency sensing mechanism before money has been supplied to the apparatus;

FIGURE 14 is a schematic electrical circuit diagram of the same weighing and currency sensing apparatus after money has been deposited; and FIGURE 15 is a timing diagram of the apparatus illustrating the sequence of operation of the cams depicted in FIGURE 12.

Figure 1:
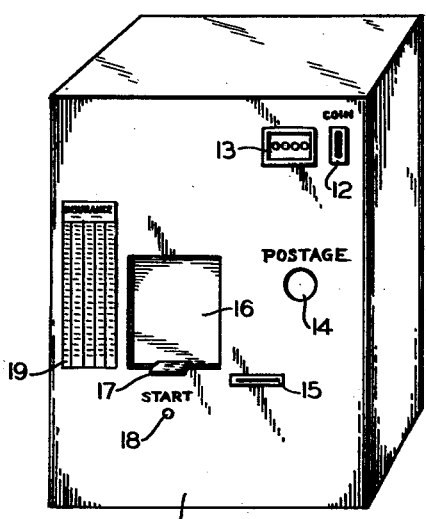
FIGURE 1 is a perspective view of the front panel, one side, and top of the apparatus.

Referring now to the figures and FIGURE 1 in particular, reference numeral 11 identifies the front panel of the apparatus which is equipped with a coin acceptance slot 12 and a coin totalizing indicator 13. The combination of the coin acceptance means and indicator showing the total amount of currency supplied is identical or similar to the mechanism incorporated in the "Mailomat" machine manufactured by Pitney-Bowes Incorporated of Stamford, Connecticut, which machine is installed in many lobbies of U.S. Post Offices throughout the United States.

The amount of postage required as determined by the weight of the article deposited is displayed to a depositor at a window 14. An aperture 15 serves for issuing a receipt to the depositor when the article deposited has been accepted and moved to a depository in the machine. A windowed access door 16 with handle 17 is adapted to slide in vertical direction and when raised exposes a deposit acceptance means upon which an article intended for deposit such as a letter, is placed. In order that the article be accepted for deposit and rendered inaccessible to the depositor or subsequent depositors, door 16 must be lowered and upon supplying a sufficient amount of postage in the form of currency at coin slot 12, a start pushbutton 18 may be depressed which action in turn, renders the apparatus operative. A printed table 19 also mounted to the front panel 11 serves to indicate the amount of insurance paid in the event that a depositor furnishes currency above the minimum fee required for mailing.

Figure 3:
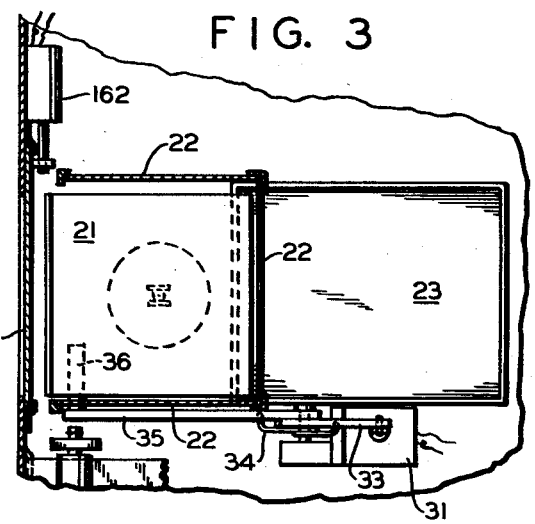
FIGURE 3 is a plan view, partly in section, along lines 3—3 in FIGURE 2.
Figure 2:
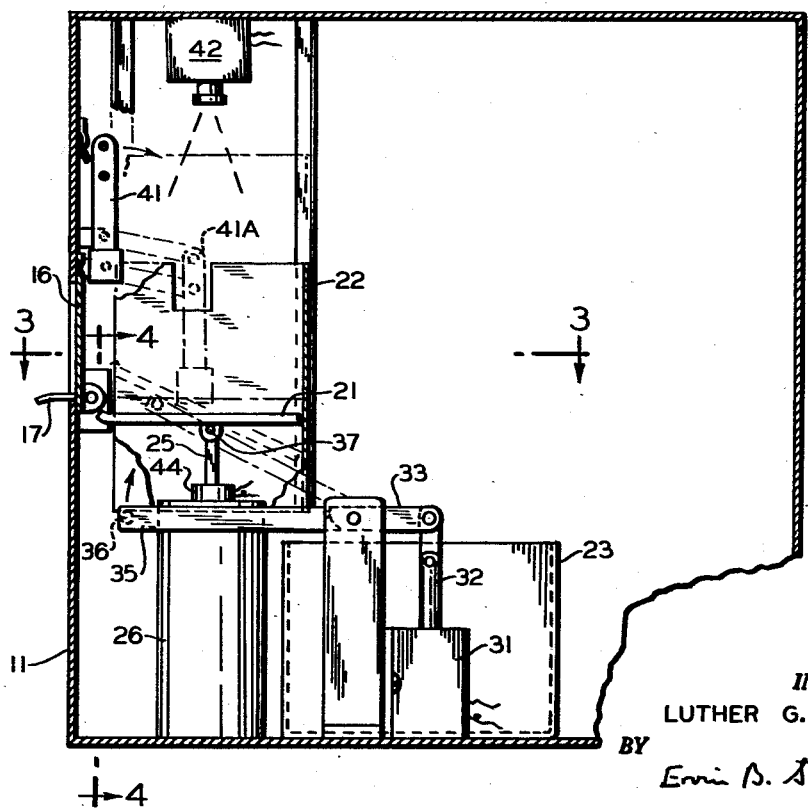
FIGURE 2 is a vertical section through the apparatus along lines 2—2 in FIGURE 4.

Referring now to FIGURES 2 and 3, the apparatus comprises essentially two distinct chambers. An article intended for deposit is placed on receiving means in the first chamber and when currency in an amount sufficient to cover the mailing fee is supplied, the article is moved from the first chamber to the second chamber, the latter being disposed inaccessible to the depositor so that an article transferred for deposit thereto cannot be removed therefrom via the first chamber or by surreptitious means.

The first chamber is defined primarily by the door 16, a weighing platform 21, and a three-sided vertical enclosure 22. The second chamber constitutes a deposit receptacle 23 into which deposits from the first chamber are transferred for storage and removal therefrom by authorized personnel only. A depositor having access to the first chamber is prevented from gaining access to the second chamber by virtue of the three-sided enclosure 22 which acts as a divider between both chambers.

Platform 21 forms a part of a weighing arrangement or scale, the latter comprising a plunger 25 and a scale housing 26. In its simplest arrangement housing 26, plunger 25, and platform 21 constitute a spring loaded mechanical scale wherein the platform moves downward in response to weight on the scale. Alternatively the scale may comprise an electrical load cell such as is well known in the art of weighing means.

In order to effect a deposit, door 16 is lifted, a letter for instance, is deposited on platform 21. When the door is lowered and a sufficient amount of currency has been supplied, and upon depressing start pushbutton 18, control means are actuated which cause the letter to be transferred from the first chamber to the second chamber. This transfer is caused by energizing solenoid 31 which lowers plunger 32, the latter being coupled to a link 33, and this link in turn actuating a torsion spring 34 and a link 35. The linkage mechanism is shown more clearly in FIGURES 9, 10 and 11 and will be described in greater detail in conjunction with these figures. Operation of these links causes upward motion of the three-sided enclosure 22 as a result of pin 36 engaging the underside of one side of the enclosure. Since pin 36 engages also the underside of platform 21, the platform becomes tilted, rotating about pivotal axis 37 as shown by the dashed lines in FIGURE 2. In this inclined position, articles resting on platform 21 slide into receptacle 23, the three-sided enclosure dividing both chambers being raised at this particular instant. It will be apparent that instead of gravity, power driven transfer means may be used to assure transfer of the articles from one chamber toward the other.

Several other mechanisms are provided in the first chamber which are, a stamping or indicia affixing means 41 which is normally held close to the front wall of the apparatus but which for the purpose of affixing indicia to the article placed on platform 21 is lowered as shown by the dashed position 41A in FIGURE 2. This indicia affixing means is shown more clearly in FIGURE 8 and will be described in conjunction with this figure. Additionally, image recording means 42, e.g., a camera, mounted near the top of the chamber are adapted to view the deposit placed on the platform 21 and to view a receipt and a record provided by the indicia affixing means. As has been mentioned, one receipt issues at aperture 15 while a correlated record is kept within the apparatus. The indicia affixing means 41 after having provided indicia for the deposit, receipt and other recording medium is returned to its position near the front panel of the apparatus so that it does not obstruct the view of the image recording means 42.

The affixing of indicia to the deposit represents additional pressure and apparent weight to the rate determining device, and in order to prevent erroneous readings during that particular time, a magnetic clutch type collar 44 encircles plunger 25. When energized, collar 44 clamps the plunger so that the scale remains unaffected and protected from any additional pressure.

FIGURES 4, 5, 6, and 7 show more clearly the arrangement of the receipt and record means arranged within the apparatus. Particular attention is directed to the fact that article A placed on platform 21 is in view of the image recording means 42 together with a portion of a record type paper tape 45 and a portion of a tape subsequently forming a receipt 46 which is dispensed through aperture 15 on the front panel of the apparatus. A supply of record type paper tape as found in cash registers is stored on supply rolls 51 and 52 which are adapted to rotate on a shaft 53, the latter being held in a supporting structure 54. The tapes are fed from their respective supply rolls between a set of rollers 55 and 56 which are resiliently biased toward one another by tension springs 257, thus clamping the tapes therebetween. Tape from roll 51 after having passed between rollers 55 and 56 issues as receipt 46 at aperture 15, whereas tape 45 from roll 52 after passing between rollers 55 and 56 is fed downwardly about a roller 57, between a set of rollers 60 and 61, and finally onto a storage roller 62. Motor 63 causes rotation of rollers 60 and 61 and a spring type belt 64 transmits motion to roller 62 in order to cause the record tape 45 to be wound up. The spring belt which is similar to the flexible belt in moving picture projectors permits differential motion between the rollers as is required when the tape on roller 62 increases in diameter.

Since the motor drives rollers 60 and 61, the advance of the tape is constant if the motor is energized for always the same length of time. Moreover, as the motion imparted by motor 63 to rollers 60 and 61 is transferred by the tape 45 to rollers 55 and 56, no separate drive means are required for causing issuance of receipt 46 from the machine. In order to permit ready removal of receipt 46 from the apparatus, it will be advantageous to equip aperture 15 with a serrated edge. Alternatively, a shearing mechanism can readily be provided at the aperture to effect cutting of the issued receipt after the tape has advanced by the proper amount through the aperture and motor 63 has come to rest.

The position of the printing heads, whereby the stamping means 41 affixes indicia to the deposited article, to the tape constituting the receipt 46 issued from the machine, and to the tape 45 remaining as a record within the machine is shown by the dashed outlines 84', 82' and 83' in FIGURE 7. These respective positions are in view of image recording means 42 as has been indicated heretofore.

Figure 4:
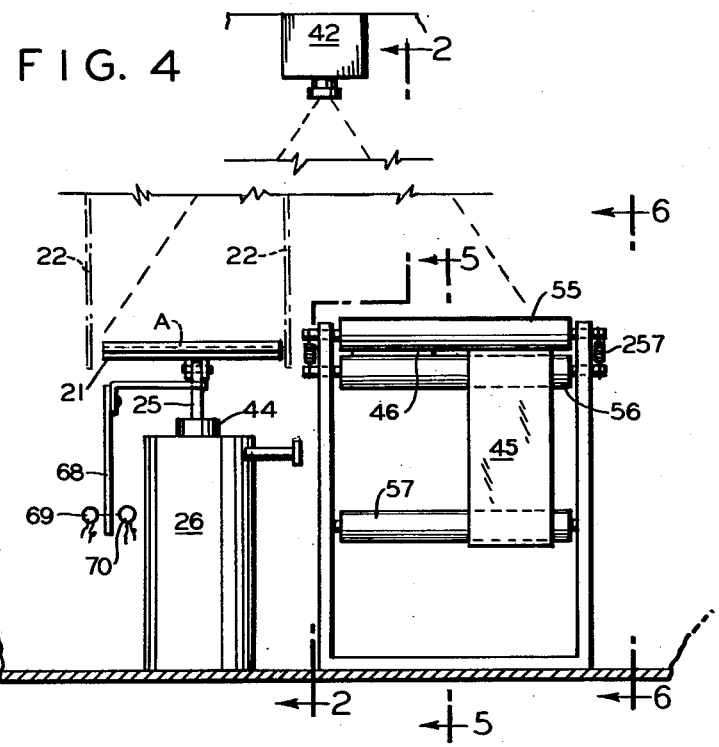
FIGURE 4 is an elevational view through the apparatus along lines 4—4 in FIGURE 2.
Figures 5, 6:
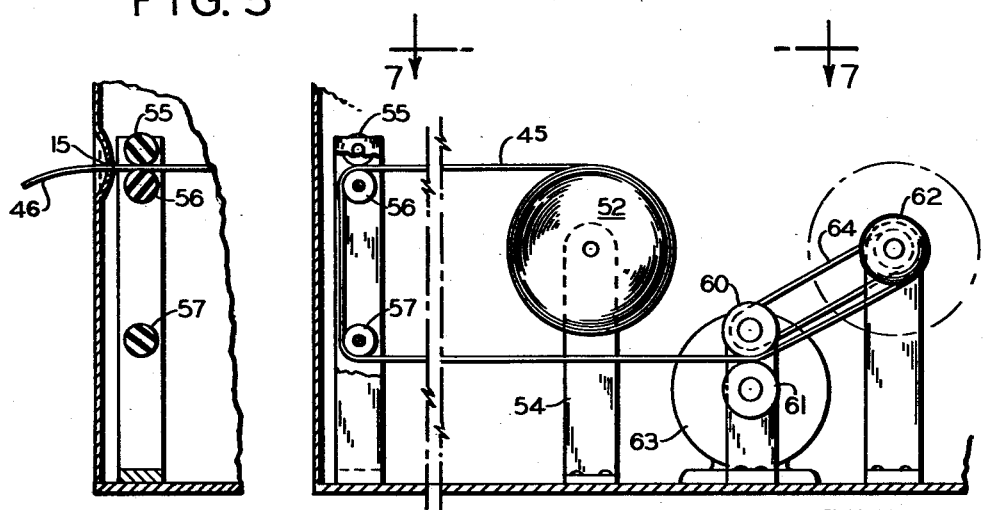
FIGURE 5 is a vertical section along lines 5—5 in FIGURE 4.
FIGURE 6 is a vertical section along lines 6—6 in FIGURE 4.

Attached to the platform 21 and plunger 25 of the scale there is an apertured flag 68, FIGURE 4, which moves vertically with platform 21. Light source 69 and photoelectric sensing means 70 coact with one another so as to count the number of passing apertures in flag 68 to provide electrical signals responsive to the weight of the article deposited on the platform to a control circuit.

Figure 8:
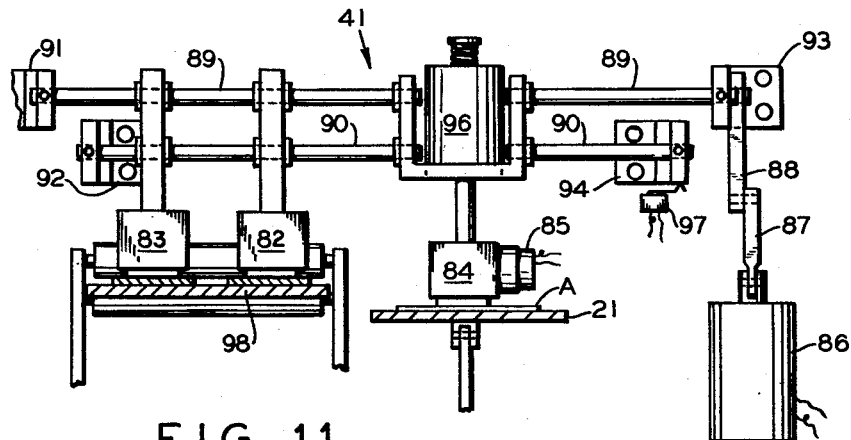
FIGURE 8 is a vertical view, partly in section, along lines 8—8 in FIGURE 7.

The indicia affixing or stamping means are shown more clearly in FIGURE 8. This mechanism comprises essentially three separate printing heads 82, 83, and 84. Each of the printing heads is adapted to affix a serial number to its respective object. As shown, printing head 82 affixes the indicia to the receipt 46 which issues from the apparatus, printing head 83 affixes indicia to strip 45 remaining as a record within the apparatus, and printing head 84 affixes indicia to the article accepted for deposit. Additionally, printing head 84 is provided with a rotary printing wheel which is indexed by a solenoid 85 in order to affix to the deposit indicia which are indicative of the amount of insurance applied to the deposit. In the particular embodiment described, the insurance is the amount of money supplied which exceeds the minimum fee necessary for effecting the deposit of the article. Since the insurance paid is a depositor selectable amount, the printing wheel coupled to solenoid 85 is indexed according to the particular amount of currency supplied as will be explained in conjunction with the circuit diagram per FIGURES 13 and 14.

The serializing printing heads 82, 83 and 84 preferably are of the type wherein the numbers are advanced by one unit every time that the heads have been actuated. Such "serializing" stamps are well known in the art of numerical printing devices. Operation, that is lowering of the printing heads, is achieved by a solenoid 86 which is connected via links 87 and 88 to two split horizontal bars 89 and 90. These bars and associated vertical supports cause the printing heads to move forward and downward as shown in FIGURE 2. Supports 91, 92, 93 and 94 are fastened to the front wall of the apparatus and the stamp heads with associated linkages swing in unison forward and downward as shown.

Since the deposit on scale platform 21 has a varying thickness, an additional solenoid 96 is provided with printing head 84 mounted to its plunger, this solenoid becomes energized when the printing heads have been lowered as sensed by switch 97 in order to provide the adjustable stroke for printing head 84 not available from solenoid 86. A platen 98, FIGURES 7 and 8, serves as a pressure plate for stamping heads 82 and 83, while the scale platform 21 when held steady by energized magnetic collar 44 serves as a pressure plate for stamping head 84.

Figure 11:
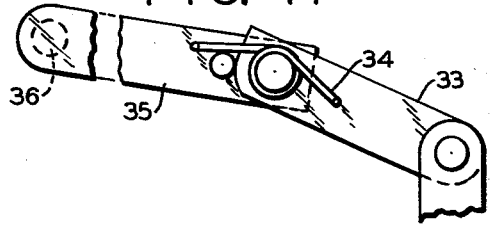
FIGURE 11 is a side view of the parts illustrated in FIGURES 9 and 10 when the same parts have assumed an actuated position.

FIGURES 9, 10 and 11 show in greater detail the linkage means employed for lifting the three-sided enclosure 22 and simultaneously tilting platform 21. Links 33 and 35 are mounted about a stationary shaft 99 and are connected to one another by means of the torsion spring 34. Pin 36 extending outward from link 35 engages the underside of one of the side walls of enclosure 22 and during its upward motion as caused by a downward pull of the plunger associated with solenoid 31, FIGURE 2, engages also the underside of platform 21 for causing tilting thereof. FIGURES 10 and 11 show this mechanism prior to its being in its actuated position. FIGURE 11 shows the same mechanism in its actuated position. Torsion spring 34 serves as an over-travel release means and prevents resistance encountered as the result of enclosure 22 having traveled to its upper limit from being transmitted to plunger 32 which is associated with solenoid 31.

FIGURES 13 and 14 illustrate schematically the operation of the coin counting and weight determining mechanisms which render the apparatus operative in response to a sufficient amount of currency having been supplied. FIGURE 13 shows this mechanism in its reset condition. The photoelectric cell 70 and light source 69 cooperate with the flag 68 attached to the scale in such a way that for each unit of weight of the article deposited on platform 21, e.g. one ounce, a light pulse signal is received at photoelectric sensing means 70. This is accomplished by means of the small, vertically spaced, apertures in flag 68, each aperture being spaced in this example to correspond to one ounce of weight. Photoelectric sensing means 70 is connected to an amplifier 101 which transmits a corresponding pulse to a stepping switch solenoid 102. A set of contact arms 103 and 104 advance downwardly in increments of one contact position for each pulse received at solenoid 102. In series with contact 103 there is connected start pushbutton 18, a solenoid 105, and door switch 106 which senses the closed position of access door 16. It results therefore that the door must be locked before the apparatus is capable of operation. In series with door switch 106 and contact 104 there is connected solenoid 85 which operates a ratchet 108 to cause the amount of insurance applied to the deposit to be responsive to the quantity of pulses received at solenoid 85. The circuit includes further a currency counter solenoid 111 which is provided with stepping switch contacts 112, 113, 114, 115, 116 and 117, each of these contacts advancing upon receiving units of money corresponding to postage in amounts of one ounce by one position increment relative to stationary bus lines 120 through 125. Thus, lines 120 through 125 are associated in ascending order with weight increments of one ounce.

FIGURE 14 shows the operation of the above described circuit when as a first step an article having a weight of two ounces has been deposited on platform 21. Light source 69 is aligned with the third aperture in flag 68 thus having provided during motion of the flag two interruptions of light or pulses to stepping solenoid 102. As a consequence thereof, contact arm 104 has advanced by two positions being now in alignment with stationary bus line 122. Contact arm 103 also has advanced by two increments being connected now to stationary bus line 121.

As money is supplied to the currency counter solenoid 111, the first fee sufficient for covering one ounce of weight causes contact 117 to become aligned with stationary bus line 120. The second increment sufficient to supply a fee for two ounces of weight causes contact 117 to be aligned with stationary bus line 121 and contact 116 with stationary bus line 120. In this position, not depicted, there is electrical connection between the positive pole of the source of energy which is connected in series with door switch 106, solenoid 105, pushbutton switch 18, through contact arm 103, the two ounce stationary bus line 121, contact 117 to ground. This connection therefore would be sufficient to cause operation of the apparatus. It shall be noted however that at this moment open circuit conditions prevails along the series connection of solenoid 85 and contact 104 and hence "zero" insurance is applied. In the example shown in FIGURE 14 two further ounce increments were deposited which are in excess of the minimum fee required. This causes contacts 112 through 117 to advance by two further increments, thus causing contact 117 to be aligned with stationary bus 123 and contact 116 to be aligned with stationary bus 122. In this manner solenoid 85 adjusting the insurance notation became pulsed twice, hence causing ratchet 108 to advance the insurance notation indicia by two increments. In the event that a further coin had been supplied sufficient for one additional ounce of weight, the contacts associated with counter solenoid 111 would have advanced one further increment and the breaking and remaking of electrical circuit connections between contacts 112 through 117 with respect to solenoid 85 would have caused another advance of ratchet mechanism 108. This currency counter as will be apparent requires "break before make" contacts which are standard in the industry.

It will be noted that as soon as a fee is furnished which corresponds to the minimum fee required for the weight of the article, there is an electrical circuit established from the positive side of the source of energy via closed door switch 106, solenoid 105 to ground whenever start pushbutton 18 is depressed.

Figure 12:
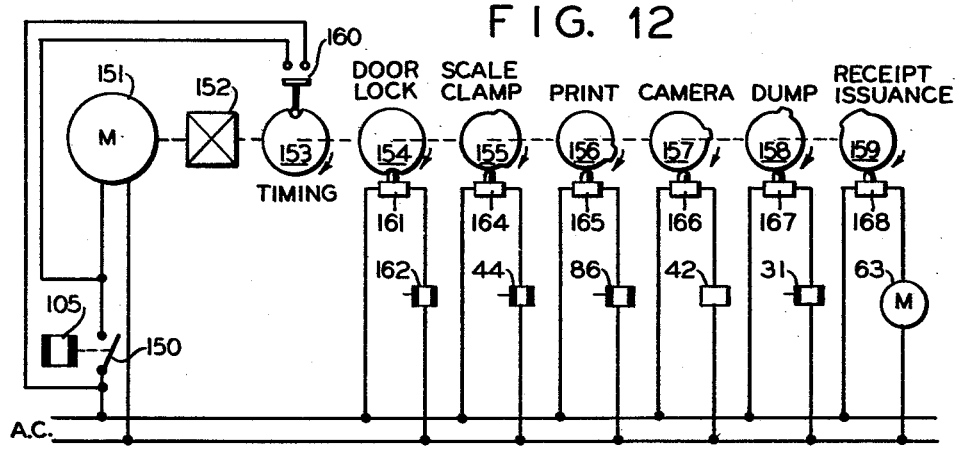
FIGURE 12 is a schematic circuit diagram of the control means for rendering the apparatus operative.

FIGURE 12 shows the control means operated by depressing start switch 18.

With the circuits established as shown in FIGURE 14, upon depressing start switch 18 solenoid 105 is energized momentarily while the start switch is depressed. Energizing of solenoid 105 closes associated relay contact 150, thus applying electrical energy to timing motor 151. The timing motor via a gear reducer 152 drives a series of timing cams 153 through 159. Cam 153 is a timing cam and serves to close switch 160 in order that pushbutton 18 may be released without stopping operation of the control circuit for one cycle. With reference also to FIGURE 15, the first important operation comprises the locking of the access door 16 so that the deposit cannot be removed while the deposit acceptance operation is in progress. Cam 154 operates switch 161 which in turn applies energy to locking solenoid 162, FIGURE 3, to maintain the door locked for one cycle as shown in FIGURE 15. Next, cam 155 operates switch 164 to cause energy to be applied to collar 44 for clamping the scale. Cam 156 and switch 165 cause actuation of the print mechanism solenoid 86, thus causing indicia to be affixed to the article and to the two tapes. Cam 157 actuates microswitch 166 to cause actuation of the electrically controlled microfilm camera 42 for providing documentary evidence of the article, the indicia affixed thereupon, and of the receipt to be dispensed from the machine and the record within the apparatus. This camera is a conventional microfilm recording device with electrical release for the shutter and film transport. For the sake of simplicity, illuminating means are not shown.

Cam 158 actuates switch 167 which in turn applies power to solenoid 31 causing raising of the three-sided enclosure 22, tilting of the scale platform 21 and thereby effecting transfer of the deposited article from the first chamber into the second chamber, that is, transfer of the deposited article to storage receptacle 23. Finally, cam 159 actuates switch 168 which in turn energizes motor 63 for a predetermined amount of time in order to cause issuance of a receipt and advance of the respective paper tapes. This completes one cycle of operation. Resetting of solenoids 102 and 111, and zeroing of the insurance printing wheel is readily accomplished during issuance of the receipt or upon raising the printing heads. This operation is well understood in the art, especially since most commercially available stepping switches incorporate a homing or reset solenoid.

It will be apparent that the foregoing machine can be combined with a paper currency accepting device in order to provide for the acceptance of paper currency instead of coin money. Additionally, change making and return devices may be employed, such as are well known in the art, in order to return to a depositor excess money. Still further, the serializing heads 82, 83 and 84 may be equipped with additional notations such as "Cancelled," or "Fee Supplied," and a date and time notation in order to eliminate subsequent cancellation requirements.

Apparatus of the type disclosed may be arranged for various classes of mail or alternatively, the fee requirements may be adjusted in the electrical circuit to suit the postage requirement for each category of mail. In order to simplify an apparatus of this type, it will be apparent to those skilled in the art that the image recording means and the provision of applying excess currency as insurance may be deleted. Alternatively, insurance notation may be affixed by a separate and independent mechanism which is associated with a separate currency acceptance means.

The apparatus described hereinbefore, therefore, accepts an article for deposit and renders the article inaccessible to the depositor in response to the supply of currency in an amount sufficient to cover mailing thereof. Obviously, the apparatus will be found useful for other purposes and uses whenever the weight or size of an article is related to a monetary value.

While there has been described and illustrated a certain embodiment of the present invention it will be apparent to those skilled in the art that various changes and modifications may be made therein without deviating from the spirit and intent of the present invention which shall be limited only by the scope of the appended claims.

What is claimed is:

1. In a depository machine of the type described including receipt means, the combination of: means for accepting an article for deposit; means determining the weight of the accepted article whereby the weight of the article is related to the fee required for causing deposit of the article; means associated with the machine for receiving a deposit of money; indicia affixing means; means causing said indicia affixing means to affix identifying indicia to the accepted article; image recording means disposed to view the accepted article and the indicia affixed thereto and when actuated providing an image thereof; control means causing in response to the receipt of money in an amount equal to or greater than said fee by said money receiving means actuation of the image recording means and causing also said article to be rendered inaccessible to the depositor of the article; said receipt means issuing from the machine a first receipt carrying indicia which are related to the identifying indicia affixed to the article and maintaining also a second indicia carrying receipt for record purposes within the machine, and both receipts being arranged to become disposed temporarily in view of the image recording means while said recording means is actuated by said control means.

2. In a fee charging depository machine, the combination of:
a receptacle, the contents of which are inaccessible to surreptitious removal;
first means for accepting an article for deposit in said receptacle;
second means for recognizing a characteristic of the article and producing a first signal correlated to said characteristic and representative of the fee charged for causing the article to be deposited in said receptacle;
third means for providing a second signal;
fourth means for transferring the accepted article from said accepting means to said receptacle;
control means coupled to said second means, said third means and said article transferring means for comparing said first signal with said second signal and in response to determining a predetermined relationship to exist between said first signal and said second signal automatically actuating said transferring means to cause the article to be disposed in said receptacle.

3. In a fee charging depository machine, the combination of:
a receptacle, the contents of which are inaccessible to surreptitious removal;
means for accepting an article from a depositor for deposit in said receptacle;
means for determining the weight of the accepted article and the fee to be charged for causing the article to be deposited in said receptacle, the fee charged and the weight being correlated;
means for receiving a fee;
means for transferring the accepted article from said accepting means to said receptacle;
control means coupled to said weighing means, said fee receiving means, and said article transferring means, for comparing the fee received with the fee charged, and in response to determining the fee received to be equal to or greater than the fee charged automatically actuating said transferring means to cause the article to be disposed in said receptacle.

4. The depository machine of claim 3 wherein
said article accepting means and said article weighing means are disposed in an enclosure having an aperture therein for passing therethrough an article for acceptance;
passage control means, cooperating with said aperture, having a first state wherein articles may be passed through said aperture and a second state wherein articles are precluded from being passed through said aperture, said means normally being in said first state;
said control means also coupled to said passage control means, and in response to determining the fee received to be equal to or greater than the fee charged disposing said passage control means from its first to its second state, and actuating said transferring means.

5. The depository machine of claim 3 wherein
said article accepting means and said article weighing means are disposed in an enclosure having means for passing an article to said article accepting means from the exterior of said enclosure;
said control means also coupled to said enclosure passing means, and in response to determining the fee received to be equal to or greater than the fee charged, initially precluding operation of said enclosure passing means to pass an article to and from said article accepting means to said enclosure exterior, and subsequently actuating said transferring means.

6. The depository machine of claim 5 further including means for affixing indicia to an article disposed in said enclosure;
said control means also coupled to said indicia affixing means for actuating said indicia affixing means subsequent to rendering said passing means inoperable and prior to actuating said transferring means.

7. The depository machine of claim 5 further including image recording means for viewing an article when the article is disposed in said enclosure;
said control means also coupled to said image recording means and actuating said image recording means to record an image of the article subsequent to rendering said passing means inoperable.

8. The depository machine of claim 6 further including means for issuing a receipt related to the indicia affixed to the article;
said control means also coupled to said receipt issuing means for actuating said receipt issuing means subsequent to rendering said passing means inoperable.

9. The depository machine of claim 6 further including image recording means for viewing an article when the article is disposed in said enclosure;
said control means also coupled to said image recording means and actuating said image recording means to record an image of the article and the indicia affixing thereon by said indicia affixing means subsequent to actuating said indicia affixing means.

10. The depository machine of claim 6 further including means for issuing a receipt having indicia related to the indicia affixed to the article;
means for maintaining a record having indicia related to the indicia affixed to the article;
image recording means for viewing concurrently the article and the indicia thereon, the indicia on said receipt means, and the indicia on said record means;
said control means also coupled to said image recording means and actuating said image recording means subsequent to actuating said indicia affixing means.

References Cited in the file of this patent
UNITED STATES PATENTS
2,936,684   Simjian _____ May 17, 1960
FOREIGN PATENTS
14,461   Great Britain _____ July 20, 1901